United States Patent Office 3,292,175
Patented Dec. 13, 1966

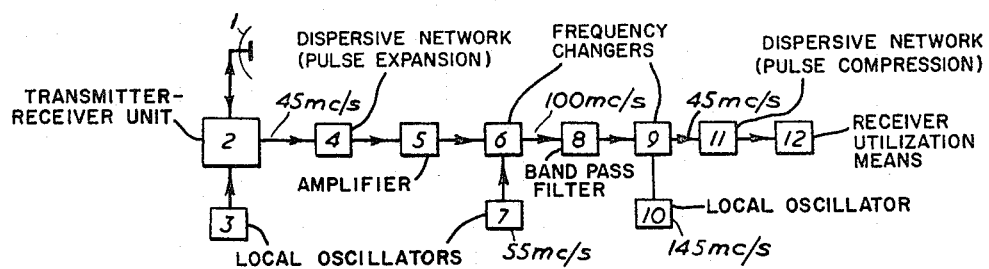
FIG./.
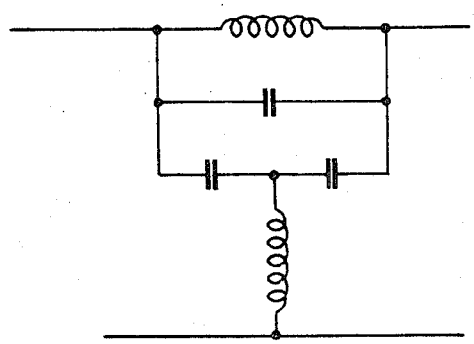
FIG.2.

3,292,175
PULSED RADAR SYSTEMS AND PULSED
RADAR RECEIVERS
Percy Samuel Brandon, Great Baddow, Essex, England, assignor to The Marconi Company Limited, London, England, a British company
Filed Sept. 16, 1963, Ser. No. 309,193
Claims priority, application Great Britain, Sept. 21, 1962, 35,948/62
4 Claims. (Cl. 343—17.2)

This invention relates to pulsed radar systems and pulsed radar receivers.

In practice a pulsed radar receiver has to handle a very wide dynamic range and this leads to considerable difficulties in the design of the amplifier therein. Such an amplifier may, to quote practical figures, be required to handle, substantially without distortion, signals ranging from the level of noise to a level of 60 or 80 dbs or even more above noise. The present invention seeks to overcome these difficulties and to provide improved pulsed radar receivers in which the dynamic range the amplifier has to handle is much reduced and the design of the said amplifier therefore simplified.

According to this invention a pulsed radar system has a pulsed radar receiver comprising a dispersive network adapted to spread the energy of input pulses fed thereto over a time which is long relative to the length of an input pulse, means for feeding received radar pulses to said network, an amplifier connected to amplify pulses which have been pulse-expanded by said network and a second dispersive network adapted to restore the amplified expanded pulses to the original input pulse length.

To give a practical figure for the amount of pulse expansion, the first dispersive network may conveniently be designed to spread the energy of an input pulse fed thereto over a time which is of the order of 100 times the length of said input pulse.

Preferably the signal channel between the amplifier and the second dispersive network includes two frequency changers in cascade and adapted jointly to convert pulse-expanded pulses at the output of the amplifier into pulses of the same length but with the direction of frequency modulation therein reversed with respect to that in the output pulses from said amplifier. This expedient enables the said second dispersive network, which is employed for pulse compression, to be of identical design with the first dispersive network employed for pulse expansion. This arrangement, though preferred, is not essential, for the second or pulse compressing network may be fed directly from the output of the amplifier, though, in this case, it will necessarily be of a design which is different from that of the preceding pulse expanding network.

The invention is illustrated in the accompanying drawing in which FIGURE 1 is a block diagram of a preferred embodiment and FIGURE 2 is a diagram of a detail.

Referring to FIGURE 1, the usual azimuth scanning aerial system 1 of a radar set is connected to a transmitter-receiver unit represented by the block 2 and of normal well known design. With the unit 2 is associated a local oscillator 3 adapted to bring the received echo pulses to a desired predetermined frequency, for example, 45 mc./s. In a practical case these 45 mc./s. received pulses might be, say, 1 μsec. long.

These pulses are fed to a dispersive line or network 4 adapted to subject them to pulse expansion and to spread the energy of each received pulse over a considerably increased length, for example 100 μsecs. Such dispersive networks are known per se and their design need not be described in detail here. Such a network might consist, for example, of a number of bridged-T all-pass sections of the form shown in FIGURE 2. Assume the network 4 to expand a pulse 1 μsec. long into a 100 μsec. pulse. It will therefore (assuming maintenance of the same energy) reduce the amplitude by 20 db. Noise will be relatively unaffected and the signal will still cover the same frequency band with a frequency sweep of, say, about 1 megacycle. In this way a signal which is N db above noise will be reduced to (N−20) db above noise.

The expanded pulse output from the network 4 is fed to an amplifier 5. It will be appreciated that, with the figures just given by way of example, the amplifier 5 will have to handle a dynamic range which is reduced by 20 db compared to what it would have to handle if it were fed directly with the unexpanded pulses from unit 2.

The amplified expanded pulses from the amplifier 5 could be fed to a second dispersive network adapted and arranged to compress the pulses back to the original length, assumed to be 1 μsec. This would, however, involve the use of two dispersive networks, one for expansion and the other for compression, of different design. In order to avoid this and to enable the same design of dispersive network to be used both for expansion and compression, the illustrated arrangement of FIGURE 1 may be employed. In this arrangement the output from the amplifier 5 is fed to a frequency changer 6 with which is associated a local oscillator 7 of, say, 55 mc./s. to provide an output from the frequency changer of 100 mc./s. This output is fed to a band-pass filter 8 having a bandwidth of, say, 1 mc./s. centred on the frequency of 100 mc./s. The output from the band-pass filter 8 is fed to a second frequency changer 9 with which is associated a local oscillator 10 having a frequency of 145 mc./s. The result is to restore the 45 mc./s. frequency in the form of long (100 μsec.) pulses with reversed direction of frequency modulation as compared with that of the output pulses from the amplifier 5. These pulses from the frequency changer 9 are fed to a second dispersive network 11 which may accordingly be of identical design with the network 4 and will compress the 100 μsec. pulses into the original length of 1 μsec. These pulses, which are amplified replicas of the output pulses from unit 2, are then utilised in any desired manner by receiver utilisation means 12.

The frequency and time figures herein given are, of course, by way of example only.

I claim:

1. In a pulse radar system including radar transmitter means for generating radar output pulses of predetermined length, the improvement comprising a pulsed radar receiver containing a first dispersive network adapted to spread the energy of input pulses fed thereto over a time which is long relative to the length of an input pulse, means for feeding received radar pulses to said network, an amplifier connected to amplify pulses which have been pulse-expanded by said network and a second dispersive network adapted to restore the amplified expanded pulses to the original input pulse length.

2. A system as claimed in claim 1 wherein the first dispersive network is so dimensioned as to spread the energy of an input pulse fed thereto over a time which is of the order of 100 times the length of said input pulse.

3. A system as claimed in claim 1 wherein there is included in a signal channel between the amplifier and the second dispersive network two frequency changers in cascade and adapted jointly to convert pulse-expanded pulses at the output of the amplifier into pulses of the same length but with the direction of frequency modulation therein reversed with respect to that in the output pulses from said amplifier, said two dispersive networks being of the same design.

4. A system as claimed in claim 1 wherein the second dispersive network is fed directly from the output of the amplifier and is of a design differing from that of the first dispersive network.

References Cited by the Examiner

UNITED STATES PATENTS 3,213,452   10/1965   Carpentier et al. ____ 343—17.2

FOREIGN PATENTS 664,614   6/1963   Canada.

OTHER REFERENCES

Skolnik: Introduction to Radar Systems, McGraw-Hill, N.Y., 1962, pp. 492–496 relied upon.

CHESTER L. JUSTUS, *Primary Examiner.*

R. E. KLEIN, J. P. MORRIS, *Assistant Examiners.*